April 29, 1952     W. D. MOUNCE     2,595,092
METHOD AND APPARATUS FOR UNDERWATER GRAVITY SURVEYING
Filed May 19, 1947
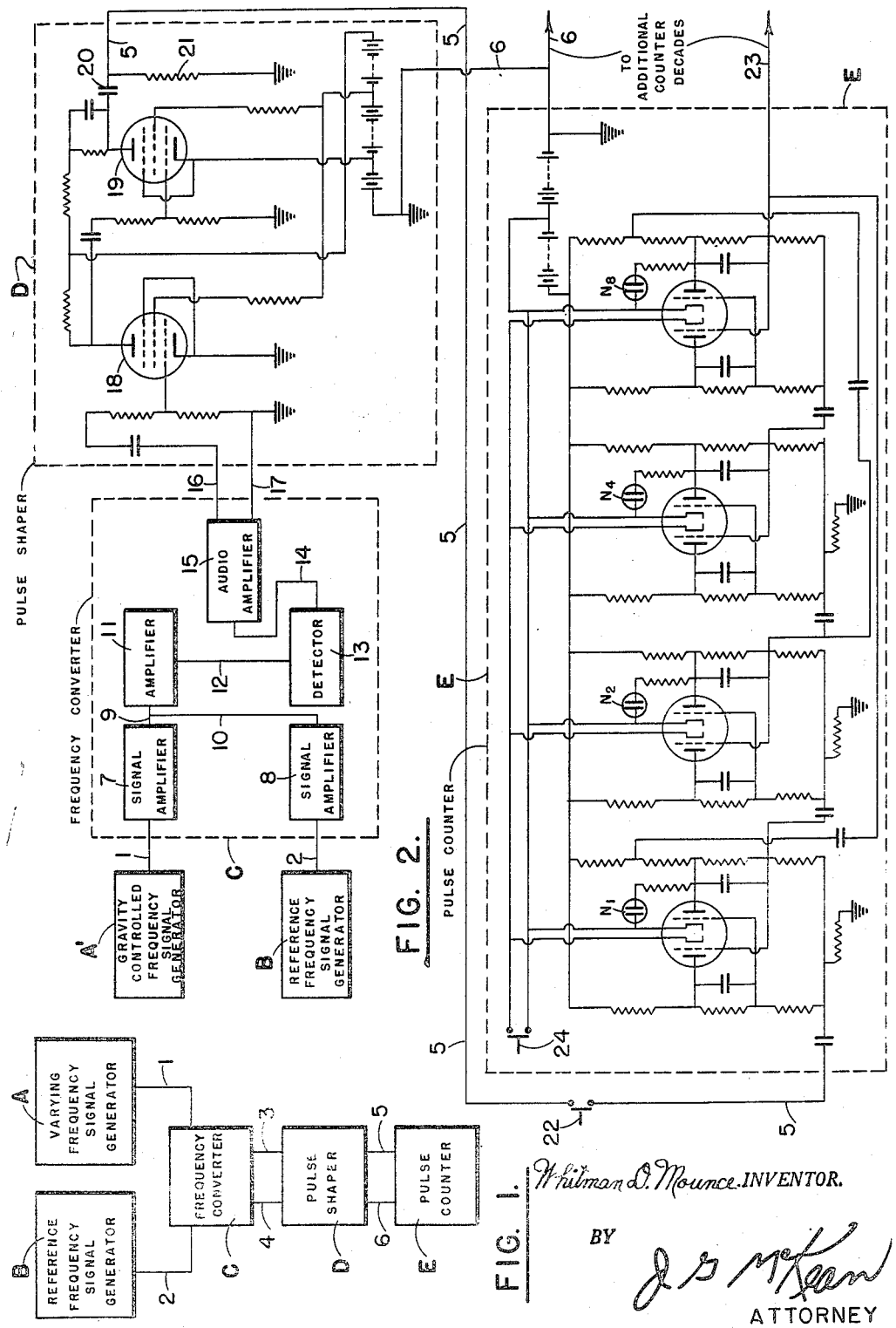
Whitman D. Mounce INVENTOR.
BY J. S. McKean
ATTORNEY Patented Apr. 29, 1952

2,595,092

UNITED STATES PATENT OFFICE 2,595,092

METHOD AND APPARATUS FOR UNDER-WATER GRAVITY SURVEYING

Whitman D. Mounce, Houston, Tex., assignor, by mesne assignments, to Standard Oil Development Company, Elizabeth, N. J., a corporation of Delaware Application May 19, 1947, Serial No. 748,966

3 Claims. (Cl. 73—382)

The present invention relates to a method and apparatus for determining the mean frequency of a varying frequency alternating current signal. For purposes of illustration the invention will be described with particular reference to a method and apparatus for determining the differences in the gravitational field of the earth at selected stations under conditions wherein the frequency of an alternating current signal generated in a gravity meter is varied in response to the gravitational field of the earth and to vibrations to which the gravity meter may be subjected.

In gravitational prospecting it is conventional to employ a gravity meter in which the mass upon which the forces of gravity may act is one plate of an electrical condenser which varies the frequency of an oscillator as a function of the gravitational force. A condenser gravity meter of this type is disclosed in U. S. Patent 2,322,681, issued to Hughes M. Zenor. In practice it is conventional to calibrate the condenser type gravity meter at calibrating stations where the gravitational field of the earth is substantially constant. The meter may then be moved to a reference base station in the field where one or more observations are made from the auxiliary apparatus employed with the gravity meter and the observations may be compared with similar observations made at the calibrating stations. In conducting a gravitational survey one or more determinations are made with the gravity meter at each of a plurality of field stations and these determinations are usually recorded as differences from determinations made at the base station. During a gravitational survey, it is common practice to repeat determinations at the base station at frequent intervals; oftentimes a determination is made at the base station after each determination at a field station so that the drift of variations in the gravity meter and associated apparatus may be accurately predicted or taken into account.

One of the fundamental requirements of a gravity meter and auxiliary apparatus suitable for gravitational prospecting is sensitivity. In order that a gravity meter may be useful in prospecting it is necessary that it be sensitive to $\frac{1}{10}$ of a milligal, which is one ten-millionth part of the average value of the gravitational field of the earth. Gravity meters having a sensitivity better than one part in ten million are well known in the art. Such meters are commonly employed upon dry land. However, since the gravity-sensitive system employed in a condenser type or in any other type gravity meter will respond to vibrations imposed upon the gravity meter case, gravity meter operators have, in the past, been forced to cease observations when the instrument was subjected to severe vibrations as, for example, from road vehicles, railroad trains, earthquakes, or even from vibrations set up by wind swaying trees in the immediate proximity of the meter. It will be apparent, therefore, that the accurate measurement of gravity differences by means of a gravity meter in locations where the meter must be submerged under water becomes very difficult, particularly when the meter is subjected to a recurring series of vibrations due to wave action. The difficulty is aggravated at times when the surface of the body of water is affected by strong wind or other adverse conditions, particularly in places where the bottom of the body of water on which the gravity meter case rests is not firm but may be made of many feet of soft mud.

I have now discovered a method and a combination of apparatus whereby the fluctuations in the frequency of an alternating current signal, such as may be generated by a condenser type gravity meter, may be accurately determined.

Among the objects of my invention are the following:

(1) To provide a method for deducing differences in the gravitational field of the earth under conditions where the gravity measuring instrument is subjected to vibrations.

(2) To provide a method for deducing differences in the gravitational field of the earth under a body of water where the gravity measuring instrument is subject to vibrations due to wave action of the water.

(3) To provide a method for deducing the mean frequency of an alternating current signal having a frequency which varies about the mean frequency.

(4) To provide an apparatus for determining the mean frequency of an alternating current signal having a frequency which varies about the mean frequency.

(5) To provide an apparatus capable of producing accurate information which may be used in deducing differences in the gravitational field of the earth under conditions where the gravity sensitive system which forms a component of the apparatus is subjected to vibrations.

Other and important objects of my invention will appear from the following description and accompanying drawing, in which Fig. 1 is a block diagram representing a combination of electrical components suitable for determining the mean frequency of a varying frequency signal; and Fig. 2 is a diagrammatic representation of an apparatus suitable for determining gravity differences under conditions where an electronic gravity meter is subjected to extraneous vibrations.

Referring to the drawing and specifically to Fig. 1, A designates a varying frequency signal generator. Details of signal generator A are not illustrated since suitable signal generators capable of producing a signal whose output frequency varies from a mean frequency are well known in the prior art and are illustrated by frequency modulated communications transmitters wherein the frequency of the output signal during any period of time varies from a specific mean frequency. Details of signal generator A are further illustrated in the prior art by the condenser type gravity meter disclosed in U. S. Patent 2,322,681 and such a gravity meter is operated under conditions whereby the frequency controlling condenser is varied in response to vibrations or external forces which causes the position of the spring-suspended plate to vary its position alternately close to and removed from the fixed plate of said frequency controlling condenser.

In the drawing, B designates a reference frequency signal generator. Details of signal generator B also have been omitted from the drawing since details of such a signal generator are well known in the art. It is to be understood that any signal generator capable of generating an alternating current signal of usable magnitude and having a selectable, substantially constant frequency may be employed for signal generator B. In a preferred embodiment of my invention signal generator B is adjusted to a frequency which is equal to or slightly greater than the maximum output frequency generated by signal generator A.

In accordance with my invention a varying frequency signal from generator A is transmitted through transmission line or pair of conductors 1 into a frequency converter C and a substantially constant frequency signal from generator B is transmitted through transmission line or pair of conductors 2 into converter C. If desired, the respective signals from generator A or generator B, or both, may be suitably amplified either before or after introduction into frequency converter C. Within converter C the signals from generators A and B are combined to produce a beat frequency signal as will be more fully explained in the description of Fig. 2. Although frequency converter C may be arranged to produce a beat frequency signal having a frequency equal to the sum of the frequencies of the signals from generators A and B, in a preferred modification of my invention, frequency converter C is arranged to produce a beat frequency signal having a frequency equal to the difference in frequencies of the signals from generators A and B and to eliminate substantially all higher frequencies. Frequency converter C is also arranged to produce a signal whose wave form is approximately that of a sine wave.

The signal from converter C is preferably introduced by means of conductors 3 and 4 into a pulse shaper D adapted to change the wave shape of the substantially sine wave signal to a series of electrical pulses. In pulse shaper D, a pulse signal is produced having a pulse frequency or pulse repetition rate substantially identical to the frequency of the beat frequency signal produced in converter C. Suitable details of pulse shaper D will be described more fully with respect to Fig. 2.

The pulse signal produced in pulse shaper D is preferably transmitted through conductors 5 and 6 into a pulse or electric wave counter E capable of indicating the precise number of either the positive or the negative electrical pulses formed in pulse shaper D during any selected interval of time. A suitable pulse counter is well known in the prior art but will be more fully explained in connection with the description of Fig. 2.

It will become apparent from the description with respect to Fig. 1 of the drawing that the frequency of the beat frequency signal produced in converter C will vary directly as a function of the varying frequency signal from generator A so long as the frequency of the signal from generator B is maintained substantially constant. It will also be apparent that the number of pulses formed in pulse shaper D and counted in pulse counter E will vary over any selected interval of time directly in proportion to the variations in the frequency of the signal from generator A. Thus, in accordance with the preferred modification of my invention, the mean frequency of the signal from generator A may be determined by subtracting the average pulse rate per unit of time, as indicated by pulse counter E, from the known frequency of the signal from generator B when the frequency of the latter signal is adjusted to a known frequency higher than the approximate means frequency of the signal from generator A. When generator B is operated at a frequency lower than the approximate mean frequency of the signal from generator A, the average pulse rate must be added to the known frequency of the signal from generator B. While, in the foregoing description, I have stated that an approximately sine wave signal from converter C is introduced into a pulse shaper D and electrical pulses formed therein are introduced and counted in pulse counter E, it will be understood by a skilled worker, particularly from the description of pulse counter E to be given in connection with Fig. 2, that in some operations the approximately sine wave signal from converter C may be introduced directly into counter E which may be arranged, in accordance with well known electronic principles, to count either the positive or the negative wave crests of said signal.

In order to illustrate my invention more fully, the apparatus represented in Fig. 2 will be described with respect to its application to one particular modification of my invention, namely, an apparatus adapted to the accurate determination of the frequency of a signal produced, for example, by a condenser type gravity meter, under conditions wherein the signal frequency generated by the gravity meter is varying in response to vibrations or other extraneous fluctuating forces applied to the case of the gravity meter. It will be understood, however, that the apparatus described with respect to Fig. 2 is also applicable to the determination of the mean frequency of a frequency modulated signal generated by other than a gravity-controlled frequency signal generator such as a condenser type gravity meter.

For purposes of description with respect to Fig. 2, A' designates a gravity-controlled frequency signal generator such as the condenser type gravity meter disclosed in U. S. Patent 2,322,681. The letter B designates a reference frequency signal generator capable of generating a signal with a selectable, substantially constant frequency which is not affected by variations in gravity or by external vibrations. The alternating current signals from gravity meter A' and reference frequency signal generator B are transmitted through transmission lines or pairs of conductors 1 and 2, respectively, into a frequency converter C. During the construction of a gravity meter, such as represented by A', the average output frequency may be adjusted to any desirable value. It is conventional to adjust the frequency of a condenser type gravity meter to produce a signal having a normal frequency of approximately 1.5 megacycles per second although other higher or lower frequencies may be employed. I have found that, when the condenser type gravity meter is enclosed in a suitable water-tight case and the meter is then employed in under-water gravitational prospecting, particularly in rough water where wave action of the water adversely affects the frequency of the signal from the gravity meter, the frequency may vary as much as 2000 cycles per second above and below the normal frequency produced by the gravity meter. Therefore, in accordance with this specific modification of my invention the frequency of the signal from generator B is adjusted to approximately 3000 cycles per second lower or preferably, as in the present illustration, higher than the approximate normal frequency of the signal from the gravity meter.

In accordance with the particular modification of my invention illustrated in Fig. 2, the respective signals from generator A' and B may be introduced into conventional amplifiers 7 and 8. It will be apparent that either amplifier 7 or amplifier 8, or both, may be omitted when the signals received by converter C from generators A' and B are of sufficient strength to produce a beat frequency signal within converter C. The two signals, amplified where desired, are combined in suitable manner such as at the junction of conductors 9 and 10 and are then introduced into an amplifier 11. Details of amplifiers 7, 8 and 11 are not shown in the drawing since suitable electronic tube amplifiers capable of amplifying the voltages of audio and radio frequency signals are well known in the prior art.

It will be apparent that, as a result of combining the signals from generators A' and B, a signal is available at the output of amplifier 11 having components of frequencies identical to the signals from generators A' and B as well as signals having frequencies equal to the sum and the difference between the generator frequencies. Accordingly, this output signal from amplifier 11 is introduced through conductor 12 into a conventional detector 13. Detector 13 may be any electronic tube detector conventional in the art which is capable of filtering out signal voltages having frequencies the same as the signals from generators A' and B as well as signal voltages having frequencies equal to either the sum or the difference in the generator frequencies, as desired. In a preferred modification of my invention detector 13 is constructed to reject signals having frequencies higher than the difference between the frequencies of the signals from generators A' and B; detector 13 is also arranged in accordance with well known principles to produce an output signal having a sine wave form or a wave form approximating a sine wave. The signal from detector 13 is fed through a conductor 14 into one or more amplifier stages 15 capable of amplifying the signal voltage to a desired extent. In accordance with the specific modification of my invention employed for illustrative purposes, the beat frequency signal derived from detector 13 represents the difference between the frquencies of th signals from generators A' and B and the beat frequency signal will, accordingly, be in the so-called "audio frequency" range. Therefore, amplifier 15 may be one or more conventional "audio frequency" amplifier stages.

It will be seen from the preceding description that the alternating current signal at the output terminals of amplifier 15, and, therefore, at the output terminals of frequency converter C, is approximately a sine wave, beat frequency signal whose frequency varies substantially identically as the frequency of the signal from generator A varies about its mean frequency.

The output signal voltage from converter C is preferably transferred through conductors 16 and 17 into a pulse shaper D comprising one or more electronic tubes such as tubes 18 and 19, capable of converting an approximately sinusoidal signal into a signal having a square or rectangular wave form, that is, a wave form having a steeply rising wave front. Suitable electronic circuits for converting sine waves to square or rectangular waves are well known in the art and may be illustrated by relaxation oscillators which are controlled by a sine wave signal of a particular frequency or range of frequencies. In the particular modification of my invention illustrated in Fig. 2, I have shown two high-gain amplifier stages which are intended to be overloaded sufficiently so that the output from the anode circuit of electronic tube 19 has a frequency identical to the frequency of the input signal to tube 18 but has a substantially square or rectangular wave form. The output signal from the anode circuit of tube 19 may be passed through a short time-constant resistance-capacity circuit comprising condenser 20 and resistor 21 adapted to convert the square or rectangular wave signal to a pulse signal having a relatively high pulse amplitude extending for a short interval of time with respect to the time interval of a single square wave cycle. It will be understood that other suitable means for converting a sine wave signal to a pulse signal having a positive or a negative pulse rate per unit of time identical to the frequency of the since wave signal may be employed.

In accordance with my invention the pulse signal from pulse shaper D is transmitted through a conductor 5, containing a switching means 22, and a conductor 6 into a pulse counting means E. Since the pulse rate of the signal often will be greater than mechanical means will count, I prefer to employ a high speed, electronic counter but it is within the scope of my invention to employ a suitable mechanical counting indicator either alone or in conjunction with an electronic counter when the pulse rate is sufficiently small to permit satisfactory operation of the mechanical counter. Electronic counters suitable for use in practicing my invention are known in the prior art and are described in "The Electronic Control Handbook" by Batcher and Moulic, published by Caldwell-Clements, Inc., New York (1944), pages 185 to 190. Since the principle of operation of an electronic counter of the type indicated generally by the letter E in Fig. 2 is described in the aforementioned reference, a detailed description of the individual parts of the particular modification of pulse counter shown in the drawing will not be described here. However, in outline it may be stated that electronic counters of the type illustrated in the drawing are basically a series of relaxation oscillators arranged to be triggered by electrical pulses of short duration and to operate indicators of the precise number of pulses received by the counting means during any selected interval of time. For the sake of simplicity in the drawing, I have shown an electronic pulse counter containing 4 relaxation oscillators capable of counting and indicating pulses from one to ten, that is, a single decade pulse counter. It will be understood, nevertheless, that in the practice of my invention I may employ any suitable number of counter decades capable of counting from one to ten thousand or more in a selected interval of time.

As previously mentioned, a pulse signal from pulse shaper D may be transmitted through conductor 5 and may be caused to operate or stop operating pulse counter E by closing or opening switching means 22. Switching means 22 may be operated manually or it may be caused to close and open the circuit by automatic timing means not shown in the drawing.

In the operation of a counter such as shown at E in Fig. 2 it is conventional to employ glow discharge tubes as, for example, neon indicators $N_1$, $N_2$, $N_4$, and $N_8$. When counter E is in operative condition and switch 22 is closed so that an electrical impulse or wave crest is transmitted through conductor 5 the first impulse will cause indicator $N_1$ to glow. The second impulse will stop the glow discharge in indicator $N_1$ and cause the indicator $N_2$ to glow. The third impulse will not extinguish indicator $N_2$ but will cause indicator $N_1$ to glow. The fourth impulse will extinguish indicators $N_1$ and $N_2$ and will cause indicator $N_4$ to glow. If switch 22 is allowed to remain closed until nine impulses have been transmitted into counter E and the switch is then opened indicators $N_8$ and $N_1$ will glow indicating that nine impulses have been received by the counter. If a second decade of counters be connected to counter E through conductors 6 and 23, a tenth impulse will cause the first indicator of the second decade to glow and indicators $N_1$, $N_2$, $N_4$ and $N_8$ will cease to glow. It will be seen then that, when employing a suitable number of counter decades, any number of impulses may be counted so long as switching means 22 is closed to permit passage of the pulse signal from pulse shaper D into the counter E.

At the end of any desired interval, switching means 22 may be opened and, after the number of impulses registered by the glowing discharge tube have been recorded, if desired, all of the glowing indicators may be extinguished by momentarily closing a switching means 24. Where more than one counter decade is employed, it will be understood that each counter decade may have a switch 24 or all of the decades may be connected to a single switch 24.

In the preceding description of the modification of my invention illustrated in Fig. 2 I have disclosed that a substantially sine wave signal from converter C is introduced into a pulse shaper D and pulses therefrom are then introduced into counter E. However, as in the case of the modification described with respect to Fig. 1, it will be understood that pulse shaper D may be omitted and counter E may be arranged to register a precise count representing the number of wave crests or cycles of the varying beat frequency signal formed in converter C during a selected time interval.

Although the preferred apparatus of my invention has been described as comprising a plurality of functional units A, B, C, D, and E it will be apparent that in a practical embodiment any of these units may be divided into sub-functional units or any and all of the functional units may be assembled into a single unit. Although in the description no mention has been made of particular electrical potentials applied to the various electron tubes it will be understood by a worker in the art that suitable potentials will be applied to the various electrodes either from batteries or other suitable source of electrical potential as is well known in the art.

Having thus described the apparatus of my invention I will now describe one method for deducing differences in the gravitational field of the earth at selected stations on or under the surface thereof under conditions wherein the frequency of a gravity controlled signal generator is caused to vary in response to fluctuating external forces or vibrations applied to the signal generator. In the present description it will be assumed that the gravity controlled signal generator A' is arranged to produce a signal having a frequency of about 1.5 megacycles per second when undisturbed by external forces or vibrations. It will also be assumed that reference frequency signal generator B is adjusted to generate a signal having a known and substantially constant frequency of about 1.501 megacycles per second, that is a frequency of about one thousand cycles per second higher than the normal signal frequency of generator A'. For simplicity of description it will also be assumed that frequency converter C is arranged to produce a beat frequency signal representing the difference between the frequencies of the signals from generators B and A'. It is to be understood, however, that the above mentioned frequencies are not critical and are arbitrarily chosen for illustrative purposes and other frequencies and combinations thereof will be readily understood and applied by workers skilled in the art.

In making a gravitational survey, gravity-controlled signal generator A' may be set up at a selected station which will be designated as a base station. Reference frequency signal generator B is likewise set up at or near the base station and both generators are connected to frequency converter C which in turn may be connected to pulse shaper D and thence to pulse counter E. After the units have been made operative, switching means 22 is closed at a selected time whereupon a beat frequency signal passes from converter C to pulse shaper D and the pulses produced therein may be counted in counter E. At the end of a selected interval of time such as, for example, 100 seconds, switching means 22 is opened and the number of pulses indicated or registered by counter E may be observed and is preferably recorded. The observed pulse count, when divided by the exact time interval, expressed in seconds, will yield a pulse repetition rate which, when subtracted from the known frequency of the signal from generator B, expressed in cycles per second, will represent the mean frequency of the signal from generator A', also expressed in cycles per second.

For purposes of a gravitational survey, however, it is unnecessary to determine the mean frequency of the signal from generator A. Having obtained a pulse count for a definite interval of time at the base station, the gravity meter or signal generator A' and associated apparatus is moved to any selected field station and, after the apparatus is made operative, the steps performed at the base station are repeated and a new pulse count may be observed and preferably be recorded. From the above description it will be apparent that, when the pulse count observed at the base station is subtracted from the pulse count observed at the field station, the difference will represent a difference in the mean frequencies of the signals generated by generator A' at the two stations. This difference in mean frequency may then be converted accurately to differences in gravitational force at the two stations by correlation with a calibration curve determined for the particular frequency meter or signal generator A' during or following construction thereof. In conventional condenser-type gravity meters approximately 10 cycles change in frequency of the generator signal corresponds to about 0.1 milligal change of gravity. It will be apparent that even though the gravitational field of the earth at the base station is different from the gravitational field at the selected field station and even though varying external forces or vibrations which may occur at the base station might be different from similar external forces acting at a different rate at the selected field station, the mean frequency of the signal generated by gravity meter or signal generator A' at the two stations can be accurately determined.

In the present description it has been assumed that variations in the frequencies of signals generated by generators A' and B are not affected by changes in temperatures, barometric pressures or variations in the spring which normally supports the movable mass in a gravity meter. It will be apparent to a practical operator skilled in measuring gravity differences with a gravity meter of the type disclosed herein that the present invention does not make any correction for the above described variations. Accordingly, in deducing the gravitational difference at selected stations, "drift" corrections and the like will preferably be applied in conventional manner. Nevertheless, corrections or allowances for vibration of the gravity controlled signal generator need not be applied.

Having fully described and illustrated the nature and objects of the present invention, what I desire to claim is:

1. In a method for underwater gravitational surveying wherein a gravity controlled alternating current signal is generated and the frequency of said signal is varied about a mean frequency when the signal generator is subjected to external vibratory forces which normally are present in under-water surveying, and wherein said mean frequency is a function of the gravitational field of the earth, the steps which comprise producing said gravity controlled signal, generating an alternating current reference signal having a known and substantially constant frequency, mixing said gravity-controlled signal with said reference signal, converting the resulting mixed signal to produce a beat frequency signal, and registering a substantially precise count of the number of cycles in said beat frequency signal during a selected interval of time.

2. Apparatus for under-water gravitational surveying comprising, in combination, a first alternating current signal generator adapted to be submerged beneath a body of water, said generator including means for varying the signal frequency thereof in response to variations in gravitational force whereby said signal frequency is varied about a mean frequency when said generator is subjected to external vibrational forces normally present in underwater surveying and said mean frequency is a function of the gravitational field of the earth, a second alternating current signal generator adapted to generate reference signals having a known and substantially constant frequency, means for producing beat frequency signals from signals generated by said first and second generators, and electronic counting means for registering a precise count of the number of cycles in said beat frequency signal during a selected interval of time.

3. Apparatus for determining differences between the gravitational field of the earth at selected stations beneath a body of water which comprises, in combination, means for generating a first alternating current signal whose frequency varies about a gravity-controlled mean frequency when said means is subjected to external vibratory forces which normally are present in underwater surveying, means for generating a reference signal of known and substantially constant frequency, means for obtaining a beat frequency signal from said first and said reference signals, means for converting said beat frequency signal to a pulse signal having a pulse repetition rate substantially equal to the frequency of said beat frequency signal, and means for registering a substantially precise count of successive pulses in said pulse signal during a selected interval of time.

WHITMAN D. MOUNCE.

REFERENCES CITED

The following references are of record in the file of this patent:

UNITED STATES PATENTS

| Number | Name | Date |
| --- | --- | --- |
| 2,077,390 | Blau | Apr. 20, 1937 |
| 2,148,678 | Blau | Feb. 28, 1939 |
| 2,319,940 | Marrison | May 25, 1943 |
| 2,337,328 | Hathaway | Dec. 21, 1943 |
| 2,422,064 | Anderson et al. | June 10, 1947 |
| 2,431,591 | Snyder | Nov. 25, 1947 |